Jan. 24, 1961     T. TOTH     2,968,972
FLUID CONTROLLED TRANSMISSION FOR ENGINES
Filed July 9, 1959     5 Sheets-Sheet 4

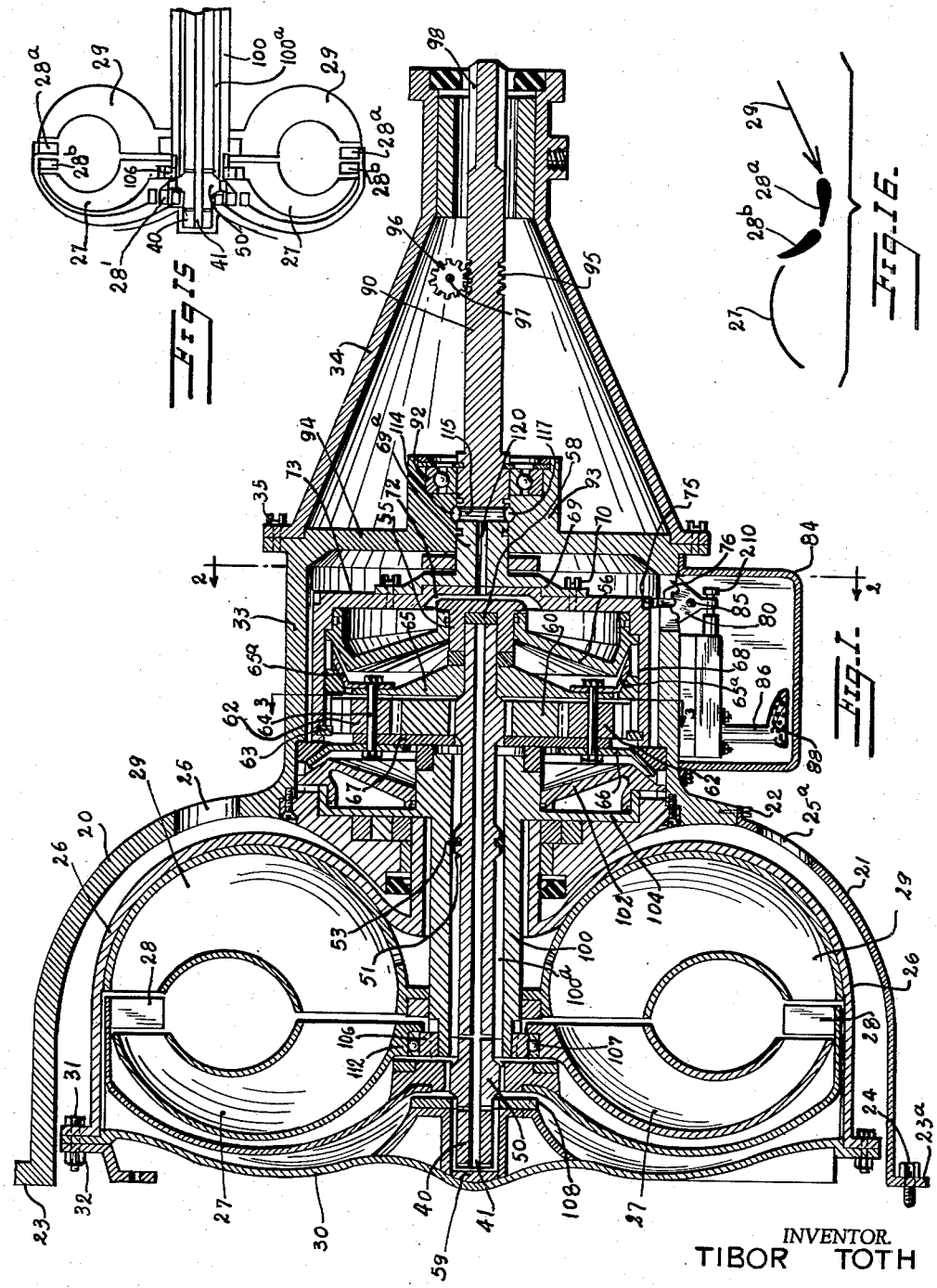

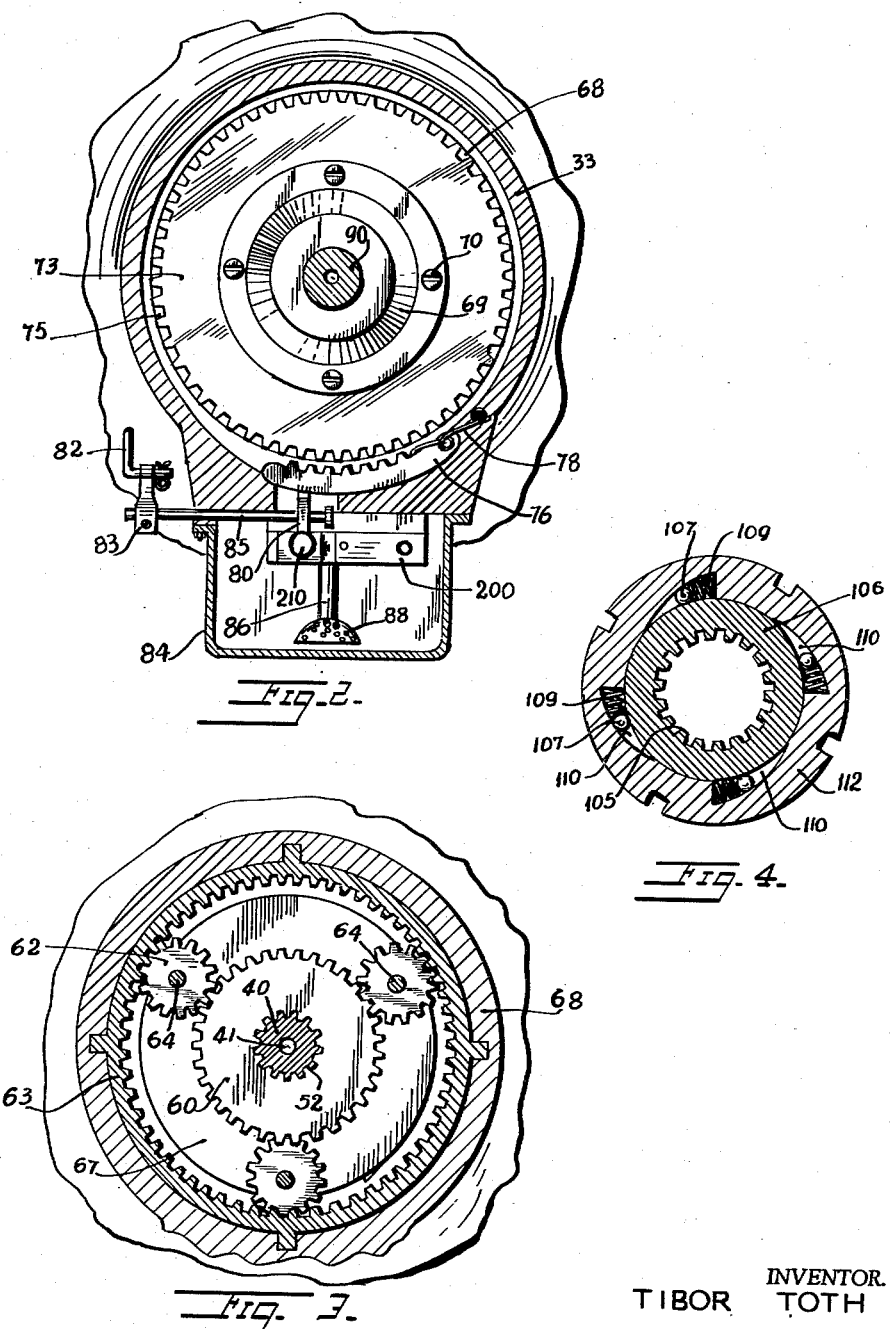

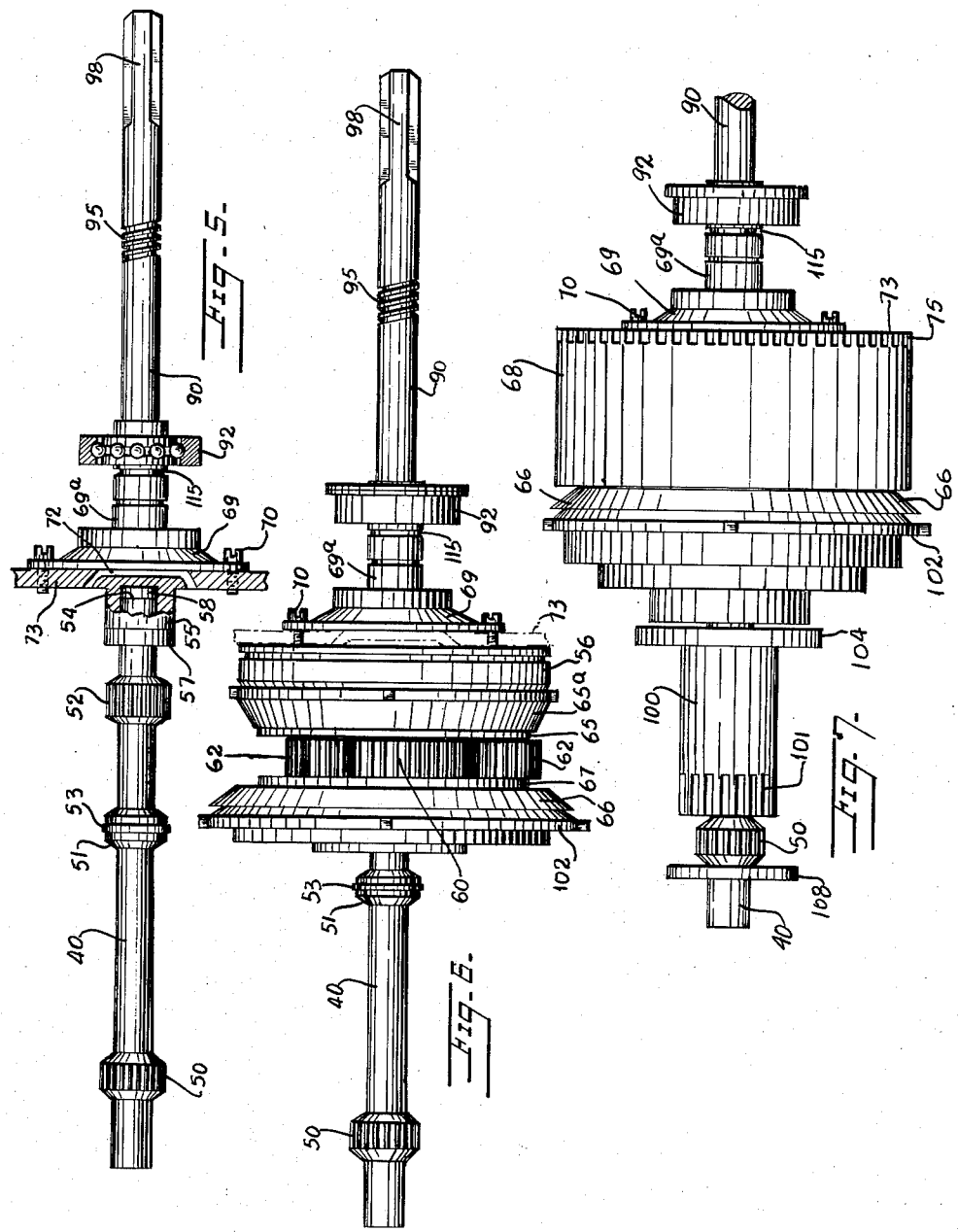

INVENTOR.
TIBOR TOTH
BY
ATTORNEY

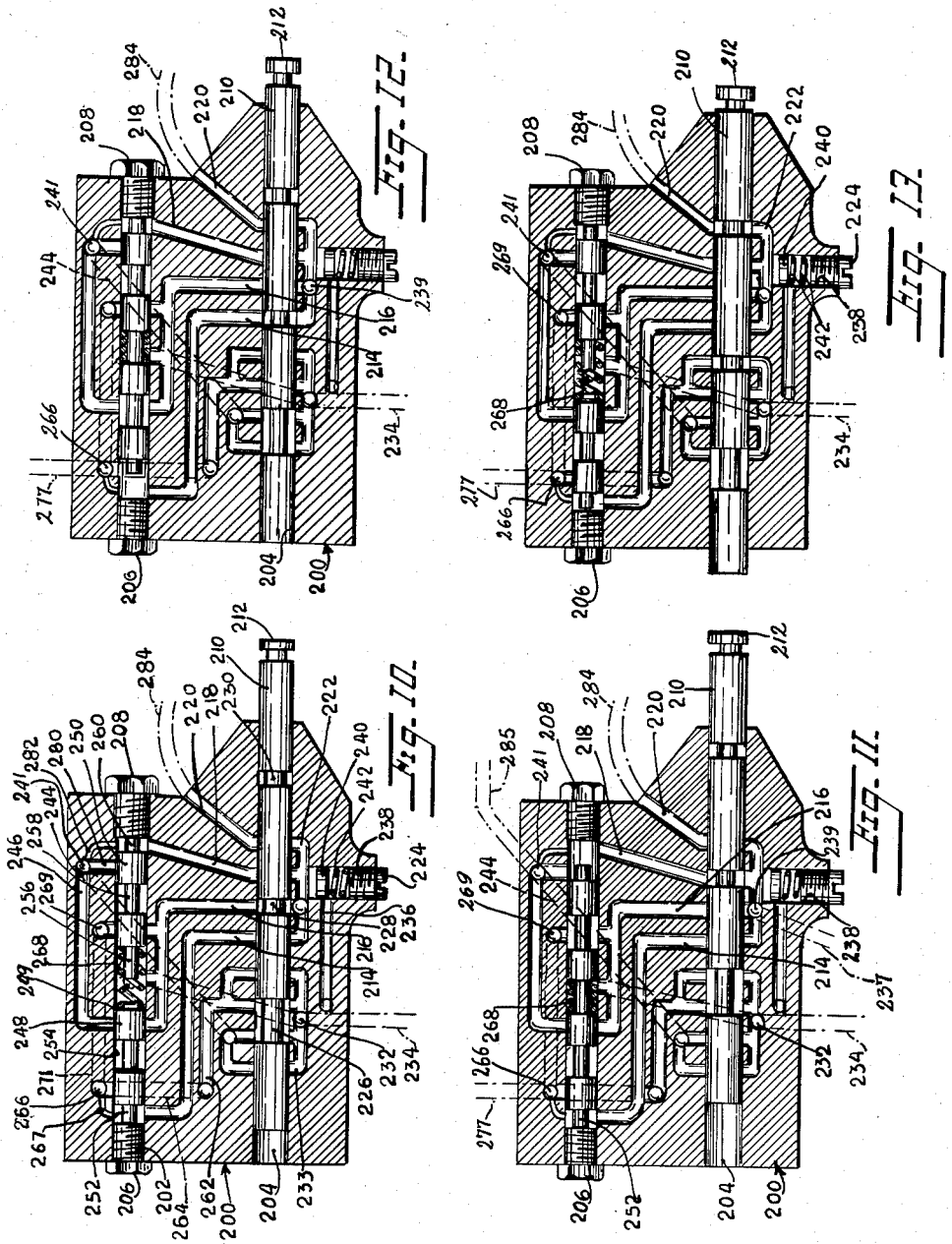

United States Patent Office 2,968,972
Patented Jan. 24, 1961

2,968,972
FLUID CONTROLLED TRANSMISSION FOR ENGINES

Tibor Toth, 87 Greeley Ave., Staten Island, N.Y.

Filed July 9, 1959, Ser. No. 825,948

3 Claims. (Cl. 74—688)

This invention concerns a fluid drive system for a vehicle or the like.

It is a principal object of the invention to provide a fluid controlled drive system including a turbine whereby oil or other fluid under pressure transmits power between a motor and a drive shaft.

It is a still further object to provide a fluid controlled drive system including a manually operable push-pull rod for actuating the transmission to neutral, drive, reverse and parking positions.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a longitudinal sectional view of a transmission housing with details of rotor shaft and turbine shown therein.

Fig. 2 is a cross-sectional view taken on line 2—2 of Fig. 1.

Fig. 3 is a sectional view taken on line 3—3 of Fig. 1 showing details of a planetary gear arrangement employed in the system.

Fig. 4 is a sectional view showing details of clutch members employed in the system.

Fig. 5 is a side elevational view of the rotor shaft employed in the transmission system, parts being shown broken away.

Fig. 6 is a further side elevational view of a portion of the rotor shaft with clutch members housing mounted thereon, part of the front clutch housing shown in dot-dash lines.

Fig. 7 is a side elevational view of the rotor in a still further stage of assembly with front clutch housing thereon.

Figs. 10–13 are sectional views of a value structure employed for controlling operation of the transmission system.

Fig. 15 is a diagrammatical view of a modified rotor device.

Fig. 16 is a diagrammatical view of the blades shown in Fig. 15.

Figure 9A:
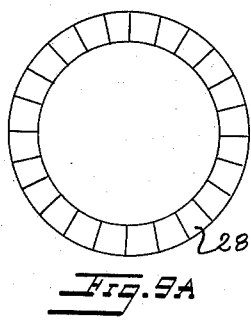
Figs. 9A, 9B, 9C are elevational views of stator, turbine and pump members employed in the system.
Figure 9B:
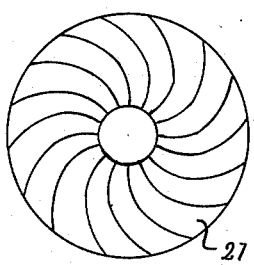
Figure 9C:
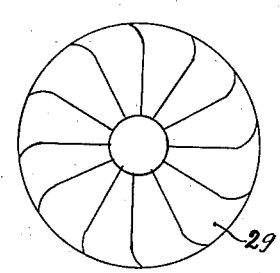

Referring to Fig. 1, there is shown a transmission housing 20 having a removable access plate 21 removably held thereon by bolts 22. Housing 20 and plate 21 have flanges 23, 23ª, respectively, which can be secured by bolts 24 to a chassis of a vehicle (not shown). The housing and plate having holes 25, 25ª, respectively, for cooling a turbine housing 26 containing rotatable turbine members 27, 28 and a stator pump member 29 shown in detail on a reduced scale in Figs. 9B, 9A, and 9C, respectively. A cover plate 30 may be secured to housing 26 by bolts and nuts 31, 32. The cover plate can also be secured to the vehicle chassis. The housing 20 has a cylindrical extension 33 to which is secured a conical extension 34 by bolts 35.

Rotatably mounted within the transmission housing is a central turbine shaft 40, best shown in Figs. 1, 6, and 7. The shaft has spaced annular enlarged splined portions 50, 52 and a centrally disposed annular ridge 51 carrying a sealing ring 53. The inner end 54 of shaft 40 rotates in a socketed bearing member 55 carrying a movable clutch plate 56.

A bearing ring 57 is mounted adjacent to bearing member 55 and on end thrust bearing disk 58 is disposed in the base of bearing member 55 for the end 54 of shaft 40. A disk end thrust bearing 59 is also provided for the other end of the shaft 40. A large gear 60 is mounted on the splined portion 52 as shown to best advantage in Fig. 3. Shaft 40 is provided with a central bore 41.

Engaged with gear 60 are a plurality of smaller planetary gears 62 normally engaged with an internally toothed ring gear 63. Gears 62 rotate on shafts 64 supported at opposite ends by plates 65, 66. A spacer ring 67 is interposed between gears 60, 62 and plate 66. Ring gear 63 is secured in a rotatable cup-shaped clutch member 68. A plate 69 is secured to the end wall 73 of member 68 by bolts 70. The base of bearing member 55 is disposed at one end in a recess 72 in wall 73. Wall 73 has peripheral cutouts or recesses 75 adapted to be engaged by the teeth of a brake member 76, best shown in Fig. 2.

Brake member 76 is biased by spring 78 away from member 68. Member 76 is pivotable to engage in recesses 75. A toothed sector plate 80 is actuated by a lever 82 for pressing member 76 into recess 75 to prevent rotation of member 68.

Plate 76 is located in a transmission oil tank 84 depending from housing section 33, see Figs. 1 and 2. A tube 86 having a perforated foot 88 is located in the tank for drawing oil therefrom. A transmission control box 200 supports tube 86. The box is attached to the underside of housing member 33. Secured to member 68 and rotatable therewith is an aligned shaft 90. This shaft rotates in a ball bearing race 92 in an extension 93 on the end 94 of housing 33. Shaft member 90 has a spiral groove section 95 engaged by a worm wheel 96. This worm wheel is part of a speedometer having a flexible cable 97 attached to wheel 96. The outer end 98 of the shaft 90 is splined and serves as a means for attaching a suitable power take-off means to the system.

A cup-shaped oil pump housing 104 is disposed concentrically with shaft 40. This housing has a tubular extension 100 provided with recesses 101 located peripherally at the end thereof. A vaned, rotatable member 102 is disposed in the pump housing for creating a draft or suction to draw oil through the system as will be described in connection with Fig. 8. In the recesses 101 are engaged corresponding teeth 105 of a circular clutch ring 106 shown in Fig. 4. A bearing ring 108 is located on the outer end of the splined section 50 of shaft 40 as shown in Figs. 1 and 7. Ring 106 coacts with balls 107 disposed in recesses 110 of a flange 112 formed on the periphery of rotor 27. Springs 109 bias the balls 107 against the periphery of ring 106.

In Figs. 10–13 are shown a valve structure 200 including a metal body provided with two longitudinal bores 202 and 204. Bore 202 is threaded at opposite ends to receive threaded plugs 206, 208. In bore 204, which is smooth throughout, there is disposed a longitudinally movable core or plunger 210 provided with an external knob or handle 212. The core 210 is manually movable axially to set the valve to neutral, drive, reverse and parking positions, respectively.

The valve structure is installed in tank 84 for cooperation with the transmission system. In the valve body are four passages 214, 216, 218 and 220. These passages open into a common chamber 222. A plug 224 is threaded in the valve body near chamber 222. Core 210 has a plurality of spaced circumferential recesses 226, 228 and 230. These recesses define core portions having reduced diameter for permitting communication between the chamber 222 and one of the four passages 214, 216, 218 and 220. A fluid outlet 232 is provided in the valve body. This outlet is connected by a conduit 234 to a pump 150 shown schematically in Fig. 8. A passage 236 connects the outlet 232 with the bore 238 in which is seated the plug 224. The plug has a spring mounted head member 240 which normally closes this passage 236. In the event of excess pressure in passages 236, head member 240 retracts against tension in spring 242 so that chamber 222 will communicate with the outlet 232 via passage 236. An inlet 239 leads into chamber 222. Inlet conduit 237 connects inlet 239 and pump 150.

Outlet 232 communicates with a passage 233 to which is connected a passage 244 in the body, indicated by dotted lines. Passage 244 terminates at a passage 246. Passage 246 communicates with bore 202. In bore 202 are movably disposed two pistons 248 and 250. Piston 248 has two portions 252 and 254 of reduced diameter. Piston 250 has portions 256, 258 and 260 of reduced diameter. Passage 233 communicates with a passage 262 to which is connected a passage 264 in the body shown by dotted lines. Passage 264 terminates at an opening 266 connected to bore 202 via a narrow passage 267. Opening 266 is also connected to an opening 269 via a passage 271 shown in dotted lines. Opening 266 communicates with pipe 277 which is connected to clutch housing 104; see Fig. 8. Each of passages 214, 216 and 218 communicates with the bore 202. A coil spring 268 is disposed between end 249 of piston 248 and the adjacent enlarged end of piston 250. This coil spring encircles reduced portion 256 and normally tends to separate the pistons as shown in Figs. 10 and 13, which are the neutral and parking positions for the valve, respectively. When pressure is exerted on the pistons in drive and reverse positions, the coil spring 268 is compressed as shown in Figs. 11 and 12. Passage 246 also communicates with bore 202 via a larger diameter passage 280 and a smaller diameter passage 282 and with an outlet conduit 285. Passage 220 is connected to the tank 84 by a conduit 284. Conduit 285 terminates at a passage 114 defined by a groove 115 in shaft 90 and a corresponding groove 117 in extension 93 of housing section 33; see Figs. 1 and 8. This passage 114 communicates with bore 120 in cylindrical extension 69ª of plate 69.

Figure 8:
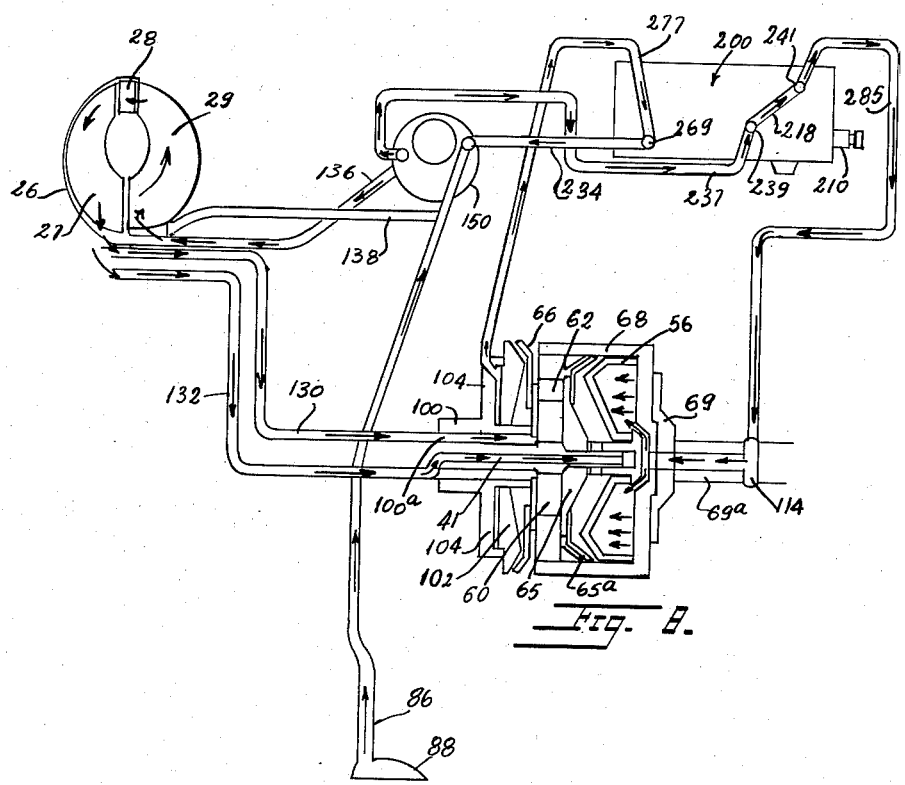
Fig. 8 is a diagram of an oil flow circulation scheme in drive position.

The operation of the system will be described with particular reference to Fig. 8 in which parts corresponding to those shown and described in connection with the other figures of the drawings, are shown diagrammatically. Lubricating oil is supplied from an oil supply (not shown) to the several rotating parts. An oil line 130 is connected to an annular channel 100ª defined between shaft 40 and tubular element 100. Another oil line 132 is connected to bore 41 in shaft 40. Pipe 86 draws transmission fluid such as transmission oil from tank 84 via foot 88. The transmission fluid is drawn under suction created by pump 150 and is delivered to the pump. If the valve 200 is set to the drive position of Fig. 11, the pump 150 delivers the fluid under pressure via conduit 237 to inlet 239. The fluid passes through channel 218 in the valve to outlet 241 and out of the valve through conduit 285 to passage 114. From the passage the fluid flows under pressure into the clutch housing 68 as shown by the arrows in Fig. 8. The fluid entering the clutch housing causes coupling of plate 56 with the annular clutch ring 65ª mounted on plate 65. The transmission fluid also passes under pressure from pump 150, via conduit 136 to the turbine housing 26 causing rotation of rotors 27 and 28. The fluid passes to the rotors 27, 28 from the stator 29. The fluid leaves the rotors and is drawn back under suction through conduit 138 and pipe 86 to the pump 150. Due to the coupling effect of the fluid in clutch housing 68, rotation is effected of the shaft 90 in direct drive. Gears 62 and 63 are engaged. Suction is applied to plate 102 to retract it from plate 66.

In order to set the valve 200 for direct drive, the plunger 210 must be drawn out to the position shown in Fig. 11. This is done manually by operation of lever 82 which is operatively connected to plunger 210 via link 83, shaft 85 and plate 80 which is connected to the plunger. The lever 82 is operable manually to set the plunger in each of the other positions shown in Figs. 10–13.

To set the system for reverse drive, the plunger 210 is pushed in to the position shown in Fig. 12. Then gears 62 and 63 are caused to disengage so that housing 68 and shaft 90 will rotate in the same direction as that of shaft 40. This disengagement is effected by moving clutch plate 102 to the right as seen in Figs. 1 and 8. This will cause fluid under pressure to be applied to plate 102 via conduit 277 to move it to the right. In valve 200, the fluid under pressure entering inlet 239 passes through passage 214 to outlet 266 and out through pipe 277 to housing 104 where the fluid moves the plate 102 to the right causing engagement of the gears 62 and 63 and effects reverse drive of shaft 90.

When plunger 210 in the valve 200 is in the neutral position of Fig. 10, outlets 266, 241 and 220 are blocked. When the plunger 210 is in the parking position of Fig. 13, outlets 266 and 241 are still blocked but passage 220 is opened so that any oil in the valve can drain out to the tank 84 through conduit 284. At the same time that the plunger 210 is pushed in fully in the parking position, the braking shoe plate 76 engages in the recesses 75 at the end of housing 68 to prevent rotation of this member and consequently to lock shaft 90 against rotation.

Figure 14:
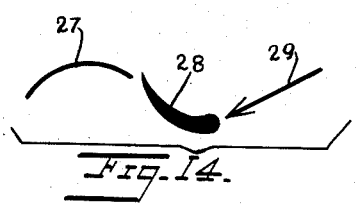
Fig. 14 is a diagrammatical view of the rotor blades shown in Figs. 9A, 9B, and 9C.

In Fig. 14 the rotor blades are shown diagrammatically.

In Fig. 15 the rotor blade arrangements are shown diagrammatically, but instead of showing one turbine, a pair of turbines 28ª and 28ᵇ are shown to be used for heavy load, and a planetary gear device 28' is provided for the turbine member 28ª and 28ᵇ. In other respects this form of the invention is similar to the previous form and corresponding parts may be recognized by similar reference numerals.

In Fig. 16, the rotor blades of Fig. 15 are shown diagrammatically.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. An automatic fluid drive system, comprising a fluid pump, a tank for said fluid, conduit means connecting said tank and pump for drawing fluid therefrom under suction created by said pump, a turbine, said turbine being connected to said pump and receiving fluid under pressure therefrom, a shaft connected to and driven by said turbine, a second shaft operatively connectable to the first shaft, forming an extension thereof, and providing a power take-off means, clutch members connected to said pump and adapted to be engaged and disengaged by fluid pressure and suction applied by said pump, said clutch members being carried by the first and second shafts, and manually operable valve means connected between said pump and clutch members for controlling engagement and disengagement thereof, said valve means comprising a block having two longitudinal bores, a pair of pistons movably mounted in one of said bores, a valve core movably disposed in the other of said bores and extending therefrom for manual actuation, and conduit means providing an inlet and outlet for fluid to and from the bores in said block, said bores being coupled by passages, said pistons and core being adapted to selectively close or open said passages to control the flow of said fluid between said inlet and outlet.

2. An automatic fluid drive system, comprising a fluid pump, a tank for said fluid, conduit means connecting said tank and pump for drawing fluid therefrom under suction created by said pump, a turbine, said turbine being connected to said pump and receiving fluid under pressure therefrom, a shaft connected to and driven by said turbine, a second shaft operatively connectable to the first shaft, forming an extension thereof, and providing a power take-off means, clutch members connected to said pump and adapted to be engaged and disengaged by fluid pressure and suction applied by said pump, said clutch members being carried by the first and second shafts, and manually operable valve means connected between said pump and clutch members for controlling engagement and disengagement thereof, said valve means comprising a block having two longitudinal bores, a pair of pistons movably mounted in one of said bores, a valve core movably disposed in the other of said bores and extending therefrom for manual actuation, and conduit means providing an inlet and outlet for fluid to and from the bores in said block, said bores being coupled by passages, said pistons and core being adapted to selectively close or open said passages to control the flow of said fluid between said inlet and outlet, said core being disposable selectively in neutral, drive, reverse and parking positions, said clutch members being engaged in the drive reverse positions, said clutch members including planetary gears adapted to be disengaged in the drive position and engaged in the reverse position.

3. An automatic fluid drive system, comprising a fluid pump, a tank for said fluid, conduit means connecting said tank and pump for drawing fluid therefrom under suction created by said pump, a turbine, said turbine being connected to said pump and receiving fluid under pressure therefrom, a shaft connected to and driven by said turbine, a second shaft operatively connectable to the first shaft, forming an extension thereof, and providing a power take-off means, clutch members connected to said pump and adapted to be engaged and disengaged by fluid pressure and suction applied by said pump, said clutch members being carried by the first and second shafts, and manually operable valve means connected between said pump and clutch members for controlling engagement and disengagement thereof, said valve means comprising a block having two longitudinal bores, a pair of pistons movably mounted in one of said bores, a valve core movably disposed in the other of said bores and extending therefrom for manual actuation, and conduit means providing an inlet and outlet for fluid to and from the bores in said block, said bores being coupled by passages, said pistons and core being adapted to selectively close or open said passages to control the flow of said fluid between said inlet and outlet, said core being disposable selectively in neutral, drive, reverse and parking positions, said clutch members being engaged in the drive reverse positions, said clutch members including planetary gears adapted to be disengaged in the drive position and engaged in the reverse position, and locking means supported by said valve means and operatively engageable with said second shaft to lock the same against rotation when said core is in parking position, said valve means having an outlet for discharging said fluid into said tank when said core is in parking position.

References Cited in the file of this patent
UNITED STATES PATENTS

| | | |
|---|---|---|
| 2,736,407 | Smirl | Feb. 28, 1956 |
| 2,876,656 | Herndon | Mar. 10, 1959 |